July 2, 1935.  O. F. LUNDELIUS ET AL  2,006,644

VEHICLE SPRING MOUNTING

Filed Aug. 7, 1933   2 Sheets-Sheet 1

Inventors
Oscar F. Lundelius
Melvin N. Lefler

Attorney.

July 2, 1935.  O. F. LUNDELIUS ET AL  2,006,644
VEHICLE SPRING MOUNTING
Filed Aug. 7, 1933  2 Sheets-Sheet 2
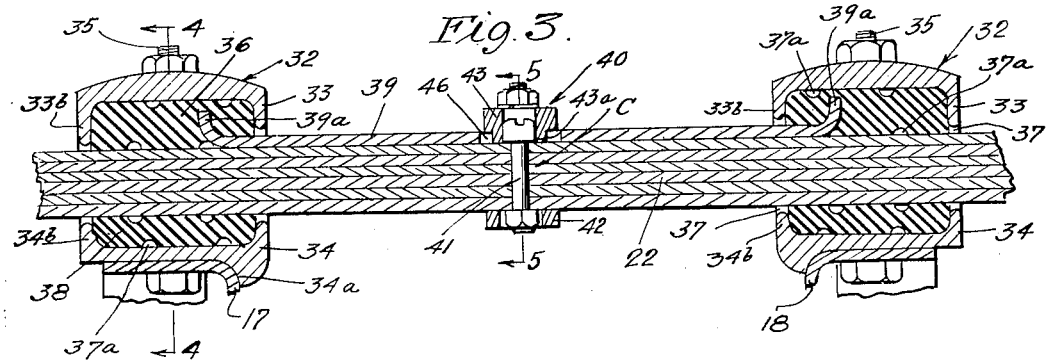
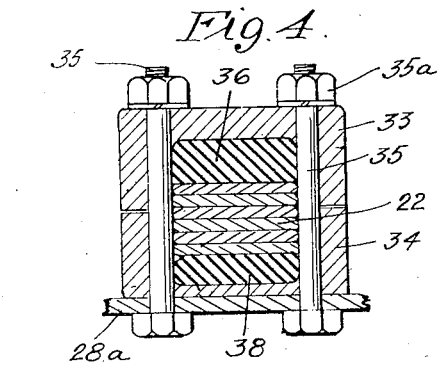
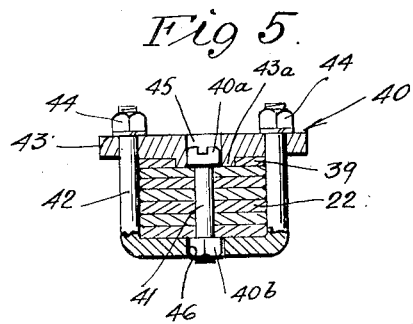
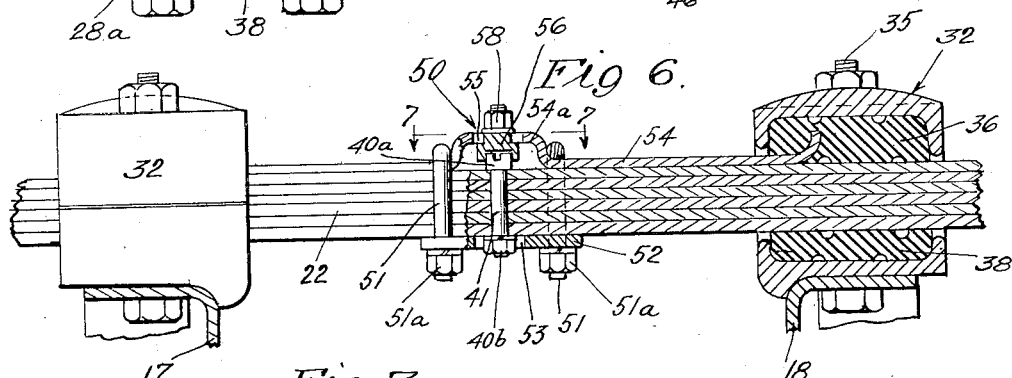
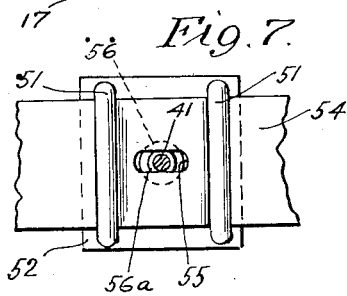
Inventors.
Oscar F. Lundelius.
Melvin N. Lefler.
Attorney

Patented July 2, 1935

2,006,644

UNITED STATES PATENT OFFICE 2,006,644

VEHICLE SPRING MOUNTING

Oscar F. Lundelius and Melvin N. Lefler, Los Angeles, Calif., assignors to Lundelius & Eccleston Motors Corporation, Los Angeles, Calif., a corporation of Delaware Application August 7, 1933, Serial No. 683,927

19 Claims. (Cl. 267—52)

This invention has to do with improvements in spring mountings of the type disclosed in Patent No. 1,810,319, granted June 16, 1931 to Oscar F. Lundelius, et al., on Spring mounting. Mountings of this general type are particularly adapted for use in vehicles wherein the frame, differential and associated parts are connected with the wheels by way of transverse springs, and wherein the springs are connected directly to frame parts or to the differential.

In spring mountings of the present type, the springs are carried within supports or boxes containing rubber pads and located at opposite sides of the longitudinal center of the spring, the principal advantage gained by so mounting the springs in rubber being that the springs have maximum effectiveness in being permitted to flex from substantially their longitudinal centers, as distinguished from the comparatively limited extent of flexure allowed the springs where their effective lengths are reduced by reason of the springs being rigidly clamped in steel mountings.

One of the principal objects of the invention is to provide an improved spring mounting in which the rubber pad elements may be maintained under substantial compression and in which the rubber is so confined as to prevent expansion, although highly compressed. Additional objects of the invention pertain to novel forms of spring clamps which, in association with a relatively stationary member, preferably a buffer plate, normally hold the spring against longitudinal movement relative to the stationary member, but which may be released to permit spring adjustment.

The invention, as well as its various appurtenant objects and features, will be understood to best advantage from the following description of the invention in certain of its typical forms. Throughout the description, reference is had to the accompanying drawings, in which:

Fig. 3 is an enlarged fragmentary section taken through the spring mounting on line 3—3 of Fig. 1;

Figs. 4 and 5 are sections on lines 4—4 and 5—5 of Fig. 3;

Fig. 6 is a view similar to Fig. 3, though partly in elevation, showing a variational form of the invention; and Fig. 7 is a fragmentary view taken on line 7—7 of Fig. 6.

Figure 1:
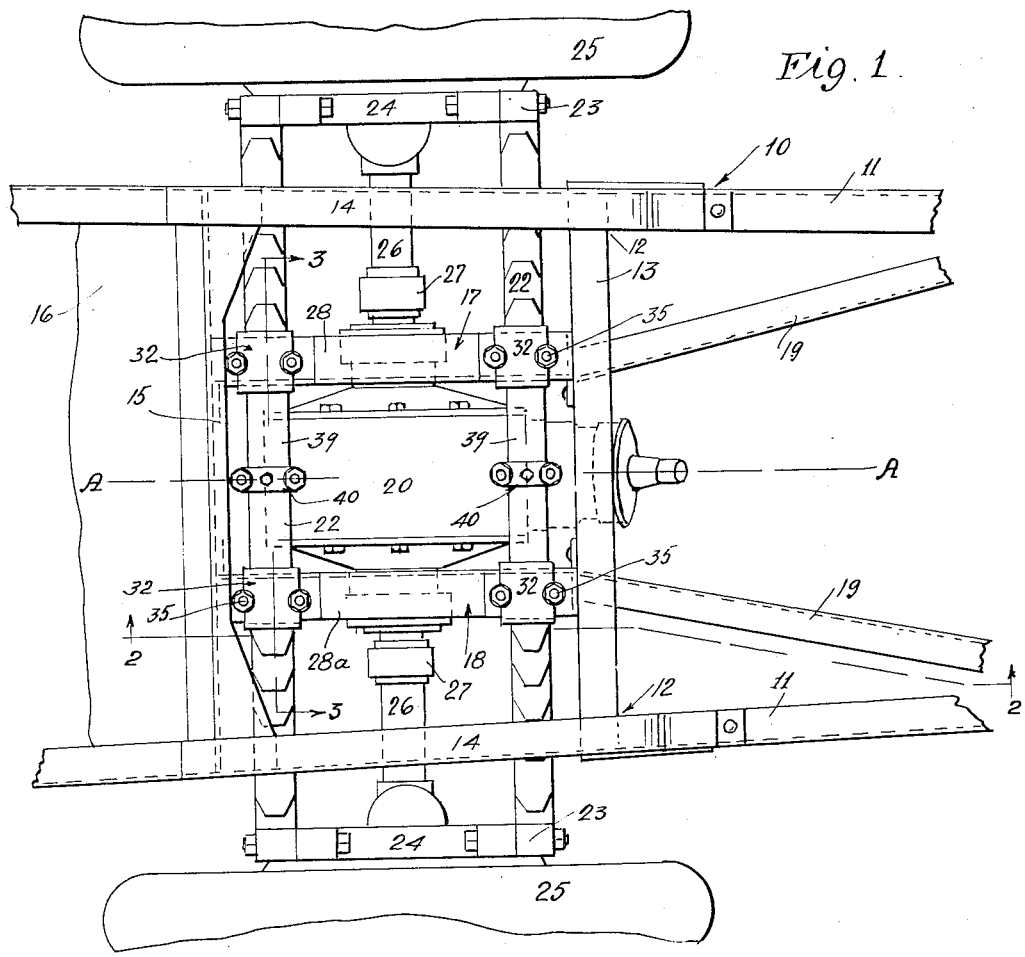
Figure 1 is a plan view showing a typical differential and rear spring assembly embodying the invention.
Figure 2:
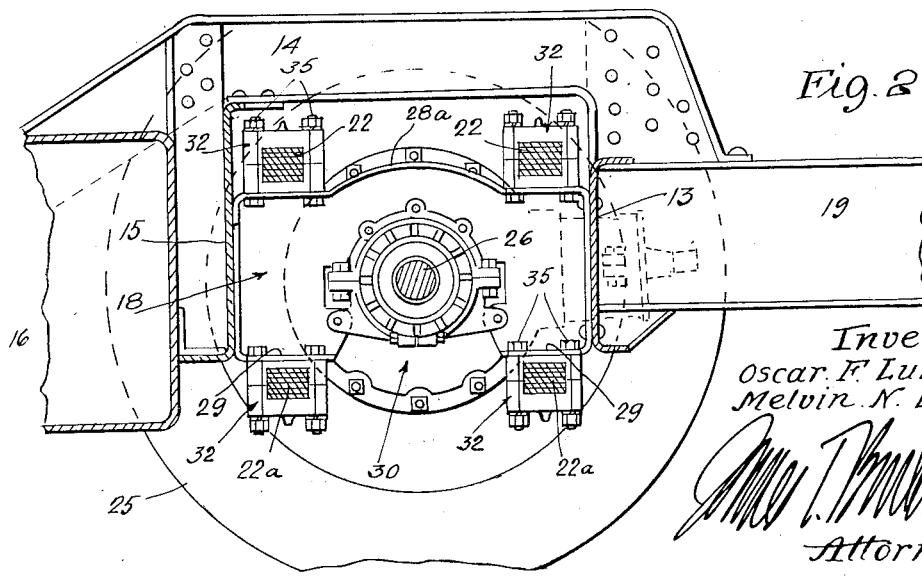
Fig. 2 is a side elevation on line 2—2 of Fig. 1.

For purposes of illustration, and in order to show the invention in one of its practical embodiments, we have illustrated a rear spring assembly, see Figs. 1 and 2, in which the mountings for the individual springs are constructed in accordance with the invention. It is to be clearly understood, however, that this showing is typical only, and that the invention may be embodied in front as well as rear spring suspension systems, and that such systems may include one or more springs in any suitable arrangement. Likewise, the herein illustrated frame construction, as applied to rear spring systems, is also to be regarded as typical merely, although the advantages of this particular frame structure render it preferable in many respects.

Referring first to Figs. 1 and 2, the frame, generally indicated at 10, comprises side rails 11 interconnected at 12 by forward transverse member 13, kick up sills 14 continuing rearwardly of the frame from the juncture between the side rails and transverse member 13. The rear portions of kick up sills 14 are interconnected by a second transverse member 15, the frame parts back of this member supporting the gasoline tank 16. A pair of longitudinally extending frame members 17 and 18, hereinafter termed subrails, extend between and connect with forward and rear transverse members 13 and 15, the subrails being spaced equidistant from the axial center line A—A of the frame. Braces 19 are joined to transverse member 13 at the point of connection of subrails 17 and 18 therewith, and diverge forwardly of the frame to connect with the side rails 11. The differential 20 is mounted in the space between the transverse members 13, 15 and subrails 17 and 18, and is supported on the subrails and forward transverse member 13, as fully set out in our copending application, Ser. No. 683,929, on Vehicle spring and differential mounting, filed on even date herewith. It will be unnecessary to describe further the arrangement and mounting of the differential since these features comprise no part of the present invention.

The rear spring assembly comprises vertically spaced pairs of springs 22, 22a attached to the upper and lower surfaces, respectively, of subrails 18 and 19, as will more fully appear hereinafter. The spring ends are pivotally connected at 23 with wheel carriers 24 to which the wheels 25 are attached. One characteristic of vehicles having this type of spring suspension system, is that the frame, differential and other parts connected thereto are supported by the springs, the advantage gained being that unsprung weight is reduced to a minimum. The wheels 25 are driven from the differential by way of flexible drive shafts 26 carrying universal joints, diagrammatically indicated at 27, which permit vertical oscillation of the drive shafts in accordance with the vehicle wheel displacement and spring deflection.

Subrails 17 and 18 have upper flanges 28, 28a of substantial width and projecting outwardly away from the differential. The bottom portions of the subrails also have flanges 29 projecting outwardly at opposite sides of central openings 30 in the subrails, which openings receive the lateral or hub portions of the differential.

Our improved spring mounting embodying the invention, is shown in detail in Figs. 3 to 5. While these views illustrate specifically the mounting for the upper rear spring, it will be understood that the mountings for the other springs are similar except that as to the lower pair of springs 22a, the parts of the mountings will be vertically reversed. Referring particularly to Fig. 3, the multiple spring 22 is shown to be carried within mountings, generally indicated at 32, attached to subrails 17 and 18, the mountings 32 being positioned at selected equal distances from the longitudinal center C of the spring. Each of the mountings comprises a metallic box composed of sections 33 and 34, the latter of which has a curved bottom surface 34a fitted to the top flange portion of the subrail. Sections 33 and 34 of the spring boxes are clamped to the spring and connected to the subrail flange, by bolts 35 extending through the box assembly and subrail flange at opposite sides of the spring, see Fig. 4.

Rubber pads 36 and 38 are confined within the hollow interiors of the spring box sections in engagement with the top and bottom surfaces of the spring. Nuts 35a may be adjusted to maintain the pads in any suitable state of compression, and we find that best results are obtained by maintaining the pads under very substantial compression. Ordinarily, the pads will be maintained under a compression in excess of 50 lbs. per sq. in. The ends of the spring box sections are substantially closed by walls 33b, 34b having sufficient clearance at 37 from the surfaces of the spring to permit maximum spring flexure without metal to metal contact.

It will be noted that the pads 36 and 38, in being confined between the side and end walls of the boxes, are prevented from expanding both transversely and longitudinally of the spring even when highly compressed, this feature of maintaining the pads in confined condition within the boxes being of particular importance. In order that any tendency for the rubber to creep longitudinally of the spring and into clearance spaces 37 when the pads are compressed, may be eliminated, we provide recesses 37a in one or both of the longitudinal faces of each pad. Thus when the pads are under compression, the rubber is permitted to occupy the recess spaces, instead of being forced out through clearance spaces 37.

The spring boxes 32 are interconnected by buffer plate 39 extending longitudinally of the spring and flatly engaging its upper surface, the ends 39a of the buffer plate projecting within the spring boxes and being embedded in pads 36. The buffer plate preferably is substantially the same width as the spring and is formed of resiliently flexible steel. The spring is releasably held against longitudinal movement relative to the buffer plate by means of a clamp, generally indicated at 40, which engages center bolt 41 of the spring. Clamp 40, see Fig. 5, comprises a U-bolt 42 extending around the spring and buffer plate, and a strap plate 43 bearing against the top surface of the buffer plate. The latter may be securely clamped to the spring by tightening nuts 44. Head 40a and nut 40b of the spring center bolt are received within openings 45 and 46 within strap plate 43 and the bottom portion of the U-bolt, respectively. The central portion 43a of plate 43 within which head 40a of bolt 41 is contained, projects downwardly within a longitudinal slot 46 in the buffer plate 39, the purpose of this slot being to permit relative longitudinal adjustment of the spring and buffer plate, as will now appear.

Numerous instances may arise where it becomes desirable to shift the spring longitudinally to adjusted position within its mounting, necessity for such adjustment arising, for example, where due to inaccuracies in the spring dimensions, the distance from the center bolt to one end of the spring may be greater than the corresponding distance to the other end, and it becomes necessary to shift the spring longitudinally to compensate for the difference. In longitudinally adjusting the spring, nuts 35a on the spring boxes may be loosened to permit shifting of the spring within its mountings, and nuts 44 of the center clamp loosened to allow movement of the spring relative to the buffer plate. Center bolt 41 and portion 43a of the clamp are then free to move longitudinally within slot 46 as the spring is shifted to adjusted position. The spring box nuts may then be tightened and nuts 44 on the U-bolt taken up to again securely clamp the center of the spring to the buffer plate.

In Fig. 6 we show a variational form of center connection between the spring and buffer plate, differing from the center clamp of Fig. 3, mainly in the provision of an additional locking feature which prevents relative longitudinal movement between the spring and buffer plate even though the U-bolt becomes loosened. The center clamp 50 in the variational form comprises a pair of U-bolts 51 extending around the spring and buffer plate at opposite sides of the spring center bolt 41 and through strap plate 52. The latter has an opening 53 which receives nut 40b. Buffer plate 54 is bowed upwardly at 54a between U-bolts 51, preventing shifting of the clamp longitudinally of the buffer plate. Bowed portion 54a of the latter has a slot 55 through which the shank 56a of locking element 56 extends, the sides of the shank 56a being beveled, as shown in Fig. 7 so as to fit within but not be capable of rotating in the slot 55. The lower portion of locking element 56 consists of a socket fitted over head 40a of the spring center bolt. The upper end of the locking element carries a nut 58 which may be tightened to prevent movement of the locking element longitudinally within slot 55.

It will be seen that normally, the spring 22 and buffer plate 54 will be held against relative longitudinal movement, both by U-bolts 51 and locking element 56, the latter serving indirectly to hold the spring against longitudinal movement by engaging center bolt 41. Should nuts 51a become loosened to the extent that the U-bolts would no longer be effective in clamping the spring against longitudinal movement, such movement is still prevented, however, by the locking element 56. It will be apparent that the center clamp assembly 50 has the same capacity as the previously described form for permitting longitudinal adjustment of the spring relative to the buffer plate since, after nuts 51a and 58 have been loosened, sufficient range of movement of the locking element 56 and center bolt nut 40b is permitted within slot 55 and opening 53 to allow the desired range of adjustment.

We claim:

1. A mounting for a vehicle spring, comprising a pair of rubber pads engaging the spring at opposite sides of its longitudinal center and at points spaced from its ends, metallic boxes confining said pads and having end walls opposing expansion of the pads longitudinally of the spring, and a buffer plate extending longitudinally of the spring and secured thereto, the buffer plate terminating inside said boxes.

2. A mounting for a vehicle spring, comprising a pair of rubber pads engaging the spring at opposite sides of its longitudinal center and at points spaced from its ends, metallic boxes confining said pads and having end walls opposing expansion of the pads longitudinally of the spring, and a buffer plate extending longitudinally of the spring and secured thereto, the buffer plate terminating inside said boxes and within said rubber pads.

3. The combination comprising a multiple leaf spring, a pair of spring mountings at opposite sides of the longitudinal center of the spring, a buffer plate extending longitudinally of the spring between said mountings, said spring and buffer plate being relatively longitudinally adjustable, a member projecting from the center of the spring, and means for releasably holding said member against movement longitudinally of the buffer plate.

4. The combination comprising a multiple leaf spring, a pair of spring mountings at opposite sides of the longitudinal center of the spring, a buffer plate extending longitudinally of the spring between said mountings, said spring and buffer plate being relatively longitudinally adjustable, a bolt extending through the center of the spring and projecting into a longitudinally extending slot in said buffer plate, and means for releasably holding said bolt against movement longitudinally of the buffer plate.

5. The combination comprising a multiple leaf spring, a pair of spring mountings at opposite sides of the longitudinal center of the spring, a buffer plate extending longitudinally of the spring between said mountings, said spring and buffer plate being relatively longitudinally adjustable, a member projecting from the center of the spring, and means for releasably holding said member against movement longitudinally of the buffer plate, said means comprising a clamp extending around the spring and buffer plate and engaging said member.

6. The combination comprising a multiple leaf spring, a pair of spring mountings at opposite sides of the longitudinal center of the spring, a buffer plate extending longitudinally of the spring between said mountings, said spring and buffer plate being relatively longitudinally adjustable, a bolt extending through the center of the spring and projecting into a longitudinally extending slot in said buffer plate, and means for releasably holding said bolt against movement longitudinally of the buffer plate, said means comprising a releasable clamp extending around the spring and buffer plate, and said clamp engaging the bolt to prevent relative movement between the clamp and bolt longitudinally of the spring.

7. The combination comprising a multiple leaf spring mounted intermediate its ends, a bolt projecting from the longitudinal center of the spring, and means connected to the spring at its center and adjustable to permit longitudinal shifting of the spring, said means comprising a member having an opening within which one end of said bolt is received, said bolt being movable within said opening in the longitudinal direction of the spring while said member remains relatively stationary.

8. The combination comprising a multiple leaf spring mounted intermediate its ends, a bolt projecting from the longitudinal center of the spring, means connected to the spring at its center and adjustable to permit longitudinal shifting of the spring, said means comprising a member having an opening within which one end of said bolt is received, and means holding said member substantially fixed against movement longitudinally of the spring, said bolt being movable within said opening in the longitudinal direction of the spring while said member remains relatively stationary.

9. The combination comprising a multiple leaf spring mounted intermediate its ends, a bolt projecting from the longitudinal center of the spring, and means connected to the spring at its center and adjustable to permit longitudinal shifting of the spring, said means comprising a member movable longitudinally with the spring and having an opening within which one end of said bolt is received, and relatively stationary member having a slot receiving the other end of the bolt, said bolt being adjustable within said slot in the longitudinal direction of the spring.

10. The combination comprising, a spring, a relatively stationary member at the longitudinal center of said spring, the spring being longitudinally adjustable relative to said member, a bolt extending through the center of said spring and projecting within a slot in said member, and a clamp extending around both said member and the spring and engaging said bolt.

11. The combination comprising, a spring, a relatively stationary member at the longitudinal center of said spring, the spring being longitudinally adjustable relative to said member, a bolt extending through the center of said spring and projecting within a slot in said member, said bolt being movable within said slot in the longitudinal direction of the spring while said member remains relatively stationary, and means for releasably holding said bolt against movement relative to said member in a direction longitudinally of the spring.

12. A mounting for a vehicle spring, comprising a yieldable cushion engaging the spring at a point intermediate its ends, a member extending longitudinally of the spring and having a turned end embedded within the cushion, and means releasably connecting the spring to said member, said member and the spring being relatively longitudinally movable by releasing said connecting means.

13. A mounting for a vehicle spring, comprising a yieldable cushion engaging the spring at a point intermediate its ends, a member extending longitudinally of the spring and terminating within the cushion, and means including a spring center bolt for connecting the spring to said member, said connecting means being releasable to permit relative longitudinal movement between the spring and said member.

14. A mounting for a vehicle spring, comprising a yieldable cushion engaging the spring at a point intermediate its ends, a member extending longitudinally of the spring and terminating within the cushion, and means comprising a spring center bolt projecting within a longitudinally extending slot in said member, for releasably connecting the latter to the spring, said member and the spring being relatively longitudinally movable by releasing said connecting means.

15. The combination comprising, a spring, a relatively stationary member at the longitudinal center of said spring, the spring being longitudinally adjustable relative to said member, a bolt extending through the center of said spring and projecting within a slot in said member, a clamp extending around both said member and the spring and engaging said bolt, and locking means in addition to said clamp preventing movement of the bolt in the longitudinal direction of the spring.

16. The combination comprising, a spring, a relatively stationary member at the longitudinal center of said spring, the spring being longitudinally adjustable relative to said member and bearing flatly against it, a bolt extending through the center of said spring, and a releasable clamp engaging said bolt and holding the spring against longitudinal movement relative to said member.

17. The combination comprising, a spring, a relatively stationary member at the longitudinal center of said spring, the spring being longitudinally adjustable relative to said member, a bolt extending through the center of said spring and projecting within a slot in said member, and a clamp extending around both said member and the spring and engaging said bolt, said clamp having a part extending across the spring and containing an opening within which said bolt is received.

18. A mounting for a vehicle spring, comprising a rubber pad engaging the spring near its longitudinal center, the end portions of the spring extending beyond said pad, a member extending longitudinally of the spring and terminating within said rubber pad, and means for releasably connecting said member to the spring.

19. A mounting for a vehicle spring, comprising a pair of rubber pads engaging the spring near and at opposite sides of its longitudinal center, the end portions of the springs projecting beyond said pads, a member extending longitudinally of the spring and terminating within said rubber pads, and means for releasably connecting said member to the spring.

OSCAR F. LUNDELIUS.
MELVIN N. LEFLER.